United States Patent

Stocchiero

[11] Patent Number: 5,853,913
[45] Date of Patent: Dec. 29, 1998

[54] RE-FILLING AND FUME-DISCHARGING DEVICE FOR ELECTRIC ACCUMULATOR BATTERIES

[76] Inventor: Olimpio Stocchiero, Via Kennedy 5, 36050 Montorso Vicentino, Italy

[21] Appl. No.: 809,776
[22] PCT Filed: Oct. 4, 1995
[86] PCT No.: PCT/EP95/03915
 § 371 Date: Mar. 27, 1997
 § 102(e) Date: Mar. 27, 1997
[87] PCT Pub. No.: WO96/10846
 PCT Pub. Date: Apr. 11, 1996

[30] Foreign Application Priority Data

Oct. 4, 1994 [IT] Italy .................................. VI94A0139

[51] Int. Cl.[6] .................................................. H01M 2/36
[52] U.S. Cl. .............................. 429/63; 429/74; 429/76; 429/77; 429/78; 429/80
[58] Field of Search ................................. 429/63, 76, 77, 429/78, 80, 74

[56] References Cited

U.S. PATENT DOCUMENTS

| | | | |
|---|---|---|---|
| 1,878,223 | 9/1932 | Woodbridge | 429/78 |
| 1,996,843 | 4/1935 | Van Meter, Jr. | 429/78 |
| 4,696,874 | 9/1987 | Tadiello | 429/64 |
| 4,749,633 | 6/1988 | Elias | 429/64 |
| 4,751,156 | 6/1988 | Olimpio | 429/64 |

FOREIGN PATENT DOCUMENTS

| | | |
|---|---|---|
| 0234278 | 9/1987 | European Pat. Off. . |
| 3539167 | 5/1986 | Germany . |
| 451671 | 8/1936 | United Kingdom . |
| 8701172 | 2/1987 | WIPO . |

Primary Examiner—Kathryn Gorgos
Assistant Examiner—Chrisman D. Carroll
Attorney, Agent, or Firm—Watson Cole Grindle Watson, P.L.L.C.

[57] ABSTRACT

An automatic re-fill device includes a body portion adapted to be secured in the accumulator lid and a tubular element having a lower float portion and being slidable within the body. The tubular element has a closure device within the body and a membrane at an upper portion thereof for increasing upward pushing force to close the closure when the float is lifted by the liquid in the accumulator.

20 Claims, 7 Drawing Sheets

FIG.10

RE-FILLING AND FUME-DISCHARGING DEVICE FOR ELECTRIC ACCUMULATOR BATTERIES

This is a national stage application of PCT/EP95/03915, filed Oct. 4, 1995.

BACKGROUND OF THE INVENTION

The invention concerns a device for the automatic re-filling of electrolyte and for discharging of fumes in the electric accumulator batteries.

It is known that the re-fill of the electrolyte in electric accumulator batteries is done by suitable devices which are applied to the lid of the accumulator and permit the automatic re-fill thereof. Various known automatic re-fill devices consist essentially of a body which is sealingly inserted into a hole in the lid of the accumulator and which has one or more inlet channels for the re-fill liquid, and an exhaust channel for the fumes. A float, operates a seal against the inlet opening to prevent further re-filling once the electrolyte has reached a pre-determined level. However, the known devices have some inconveniences. One of these inconveniences is that the force with which the float pushes the seal against the inlet opening is not sufficient to prevent leakage of the liquid due to vibrations during the re-fill operation. Accordingly, the float is made with a wide surface to insure sufficient closing force on the seal.

Normally the float is made with a diameter greater than 30 mm. This sizing creates a further inconvenience, because the hole in the accumulator lid through which the re-fill device is inserted, must have a diameter at least equal to the diameter of the float.

SUMMARY OF THE INVENTION

The present invention has the purpose of overcoming the aforementioned inconveniences.

A purpose of the invention provides an automatic fill device for electrolyte in accumulator batteries which guarantees the sealed closing of the liquid inlet once the level of the electrolyte has reached the desired value.

Another purpose of the invention is to guarantee the sealing capacity of the sealing means of the liquid inlet opening after the level has been restored, even in the presence of accidental vibrations generated while the battery is being used and during the re-fill process.

Another purpose of the invention is to provide a float with smaller dimensions as compared with the known floats.

The described objectives are achieved by an automatic re-fill device for electrolyte which allows for the discharge of fumes which build up inside the accumulators. The device comprises a body sealingly attachable to the lid of an electric accumulator having a cavity with a top. The body has one or more first holes communicating with corresponding first ducts in the lid for the discharge of fumes and one or more second holes communicating with corresponding second ducts in the lid for inlet of the re-fill liquid. A tubular element has an outer tubular section which matches the cavity in the body and a coaxial guiding element secured within the outer tubular section. The tubular element has an intermediate transversal surface therein having a through-hole. At least one through-opening is formed in the side wall of the tubular element for communicating with at least one of said one or more second holes. A tubular stick slidingly coupled in the hole, passes through the transversal surface. A float at a lower end of the tubular stick co-operates with the liquid contained within the accumulator. A flexible membrane is located at an opposite upper end of the tubular stick. Closing means formed in the tubular stick between the ends cooperates with the hole in the transversal surface to seal it, so as to selectively permit or prevent the passage of the re-fill liquid flowing from said one or more holes. The flexible membrane defines on one side within a cavity of the tubular element, an exhaust chamber communicating with said one or more first holes and with the end of said tubular stick and, on the opposite side, a chamber for the build-up of the re-fill liquid which communicates with said one or more second holes. The pressure of the liquid contained in the chamber causes a deformation of the membrane, thereby generating on said tubular stick a force which increases the pushing force created by the float against said closing means.

Advantageously and according to an exemplary embodiment, the one or more first holes for the exhaust of the fumes and the one or more second holes for the inlet of the re-fill liquid, communicate respectively with the first ducts and the second ducts formed in the lid.

According to another embodiment of the invention, hose connectors communicate with said one or more first holes or with said one or more second holes, respectively, and protrude laterally in relation to the body for engaging with a corresponding hose.

According to yet another embodiment said one or more first holes may be replaced by a single hole drilled at the bottom of the body, through which both the exhaust of the fumes during the re-fill process and the introduction of a hydrometer for the measuring of the density of the electrolyte can take place.

BRIEF DESCRIPTION OF THE DRAWINGS

Operation of the present invention will become apparent from the detailed description given hereinafter. However, it should be understood that the detailed description and specific example, while indicating exemplary embodiments of the invention, are provided by way of illustration only, and various changes and modifications within the spirit and scope of the invention will become apparent to those skilled in the art from this detailed description and from the drawings, wherein.

DESCRIPTION OF THE INVENTION

Figure 1:
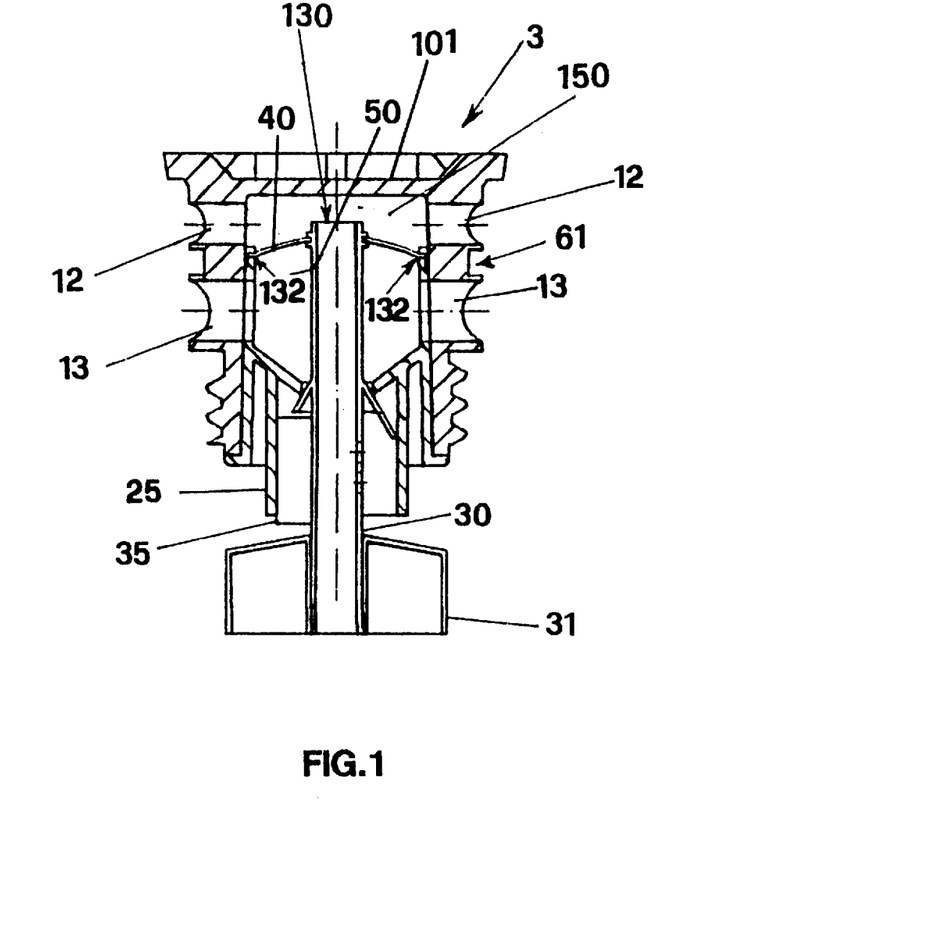
FIG. 1 shows the automatic re-fill device represented in cross-section.
Figure 2:
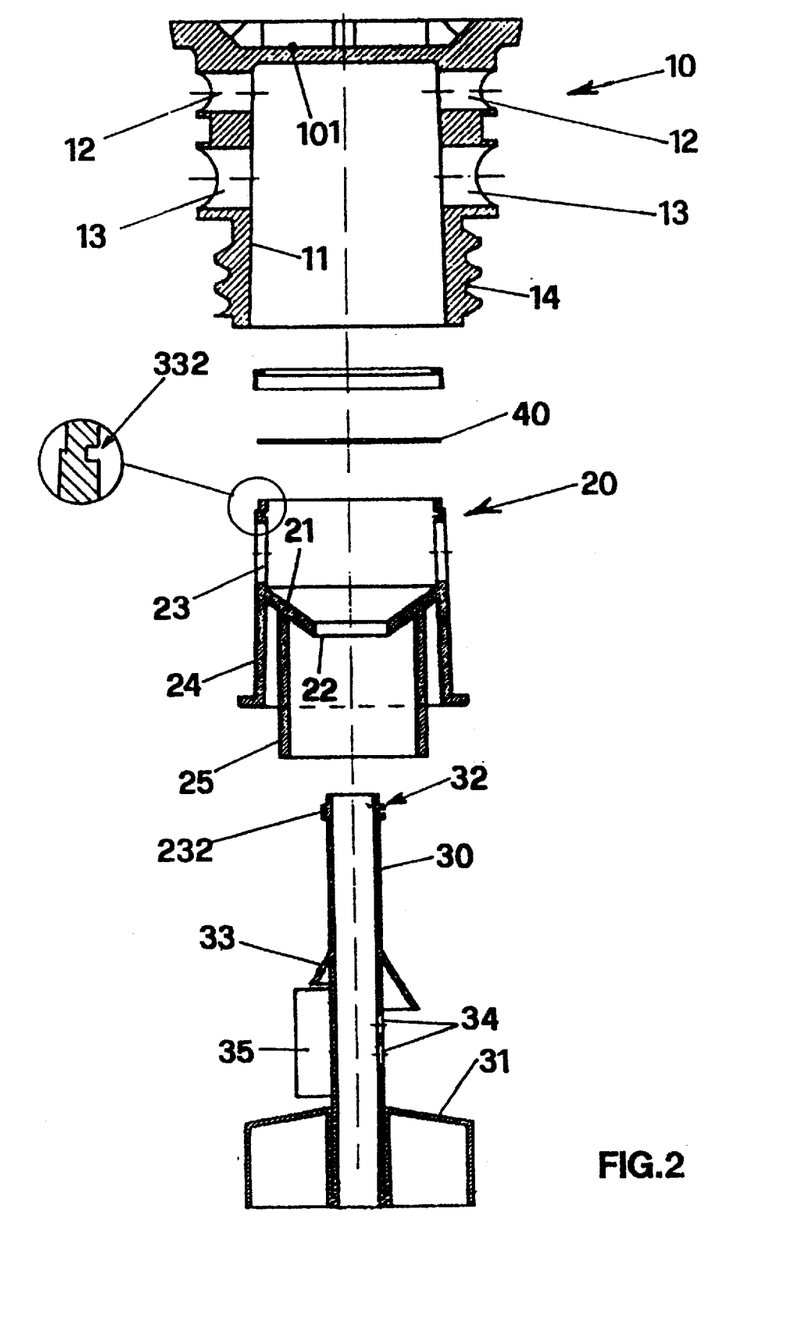
FIG. 2 is an exploded view of the device of the invention represented in FIG. 1.
Figures 3, 4:
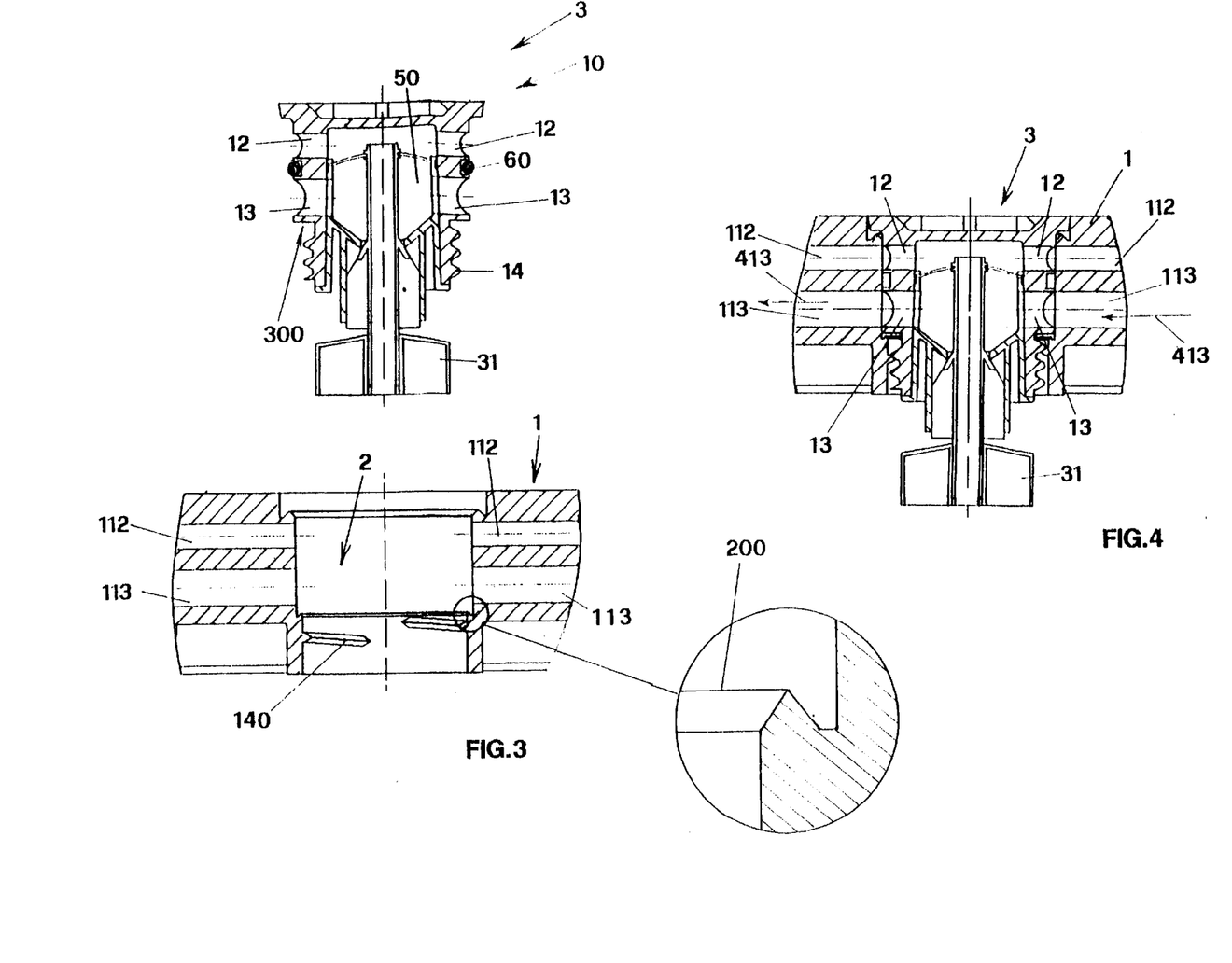
FIG. 3 is an exploded view of the device of the invention represented in FIG. 1 and includes an enlargement of a portion of the hole in the lid of the accumulator which receives the device.
FIG. 4 shows the device of FIG. 3 secured in the hole of the accumulator lid.

FIG. 1 illustrates a device 3 according to the invention for the automatic re-fill of electrolyte and for discharge of fumes from electric accumulators. FIG. 2 is an exploded form of FIG. 1. FIGS. 3 and 4 show the device 3 in relation to the lid 1 of the accumulator.

The device 3 comprises a body 10 which can be sealingly secured in matching hole 2 formed in the lid 1 of an electric accumulator. The body 10 has a cavity 11 including a side wall and a cover 101. The body 10 has one or more transverse coplanar first holes 12, each diametrically opposed to one another and lying essentially on the same plane, and one or more transverse coplanar second holes 13, also each diametrically opposed to one another. The second holes 13 lie on a plane which is below the plane of the first holes 12. As hereinafter discussed, said holes are connected with corresponding ducts which allow the discharge of the fumes from the accumulator and the inlet of the re-fill liquid into the accumulator respectively.

A tubular element 20 is attachable to the body 10. Said tubular element 20 comprises an outer tubular section 24 which is insertable into the cavity 11 of said body 10 and a cylindrical guiding element 25 arranged co-axially within said outer tubular section 24. A transversal surface 21, having the profile of a truncated cone and having a central through-hole 22, is arranged inside said tubular element 20. The transversal surface 21 rigidly connects the cylindrical guiding element 25 and the tubular section 24. The tubular element 20 also has one or more transverse through-openings 23, each of which communicates with at least one of said one or more second holes 13, when said tubular element 20 is secured within the body 10.

A tubular stick 30 is slidingly inserted into said through-hole 22 of said transversal surface 21. A float 31 is secured to a lower end of the stick 30. The float co-operates with the liquid contained within the accumulator. The stick 30 has a sealing/locking device 32 at its upper end as shown. A flexible membrane 40 having an opening sized to enclose the sealing/locking device 32 is connected to tubular stick 30 at its upper end. The inner surface area of the tubular member 24 has a sealing/locking recess 232 for receiving an outer edge of the membrane 40 to secure the same within said tubular element 20.

The tubular stick 30 also has closing means in an intermediate location comprising a shutter 33 in the shape of a truncated cone, positioned and sized for engaging the hole 22 of the transversal surface 21. In order to insure the centering of said stick 30 in the tubular element 20 into which it is inserted, radically extending guiding elements 35 extend from the tubular element 20 to slidingly engage the inner surface of cylindrical guiding element 25, of the tubular element 20. The stick 30 has exhaust holes 34 formed in the intermediate region between the fins 35 for venting fumes as hereinafter described.

As can be seen in the FIGS. 3 and 4, in order to match the automatic re-fill device 3 with lid 1 of the accumulator, the body 10 has a thread 14 for mating with a corresponding thread 140 formed in the hole 2. An O-ring 60 may be inserted into an annular seat 61 formed in an outer part of body 10 between said first holes 12 and said second holes 13. A sealing surface 200 is formed in the hole 2 above the thread 140. The body has an outwardly extending sealing flange 300 for engaging the sealing surface 200 to achieve a hermetic seal when it lies flush thereagainst. Alternatively, the threads may be replaced by pressure insertable means or a force fit.

The lid 1 has one or more fume discharge ducts 112, and one or more refill ducts 113 which are adapted to be in alignment with the corresponding first and second holes 12 and 13 in the body 1. Once the body 1 is inserted in the holes, the first holes 12 are in alignment with ducts 112 and second holes 13 are likewise in alignment with ducts 113. In an exemplary embodiment, the ducts 112 and 113 are formed in the lid 1 directly during the molding process.

Figure 6:
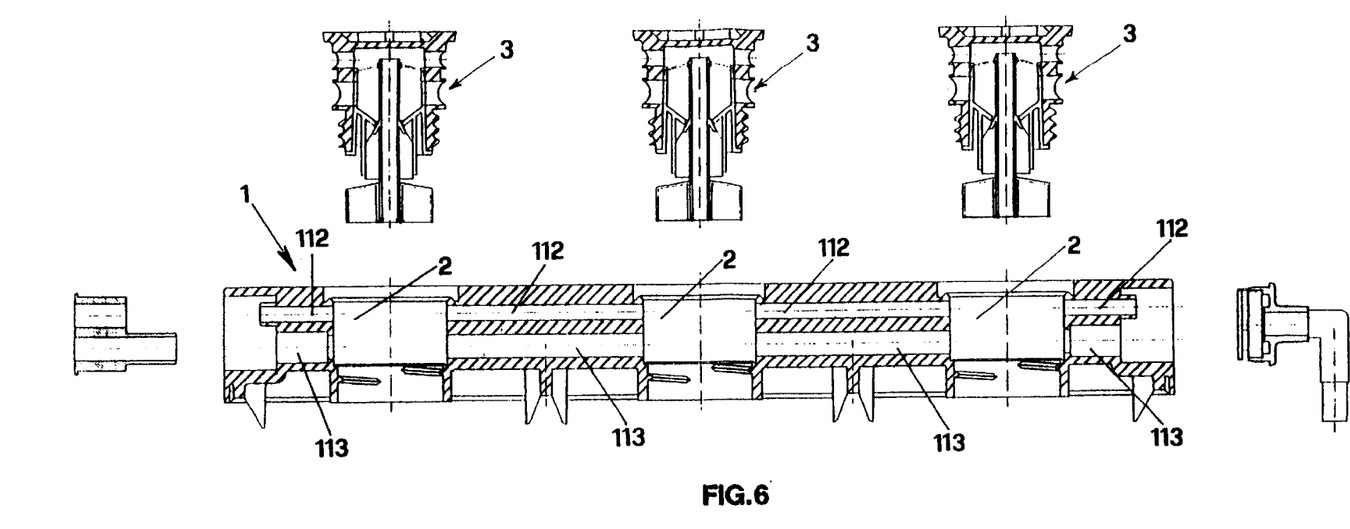
FIG. 6 shows an exploded cross-section of a plurality of re-fill devices according to the invention and of the lid of the accumulator into which said devices are inserted.
Figure 7:
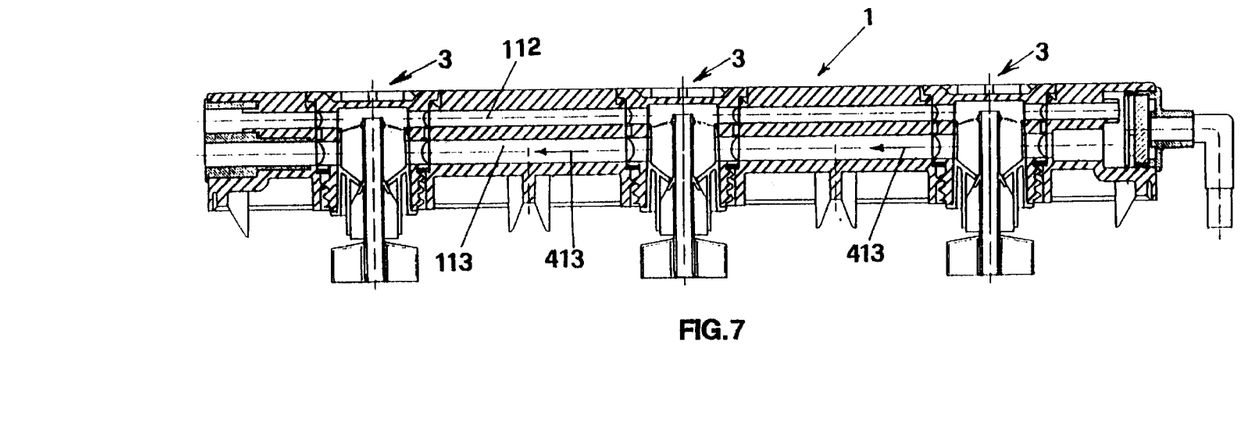
FIG. 7 shows the device in FIG. 6 secured in the lid.

As can be observed in the FIGS. 6 and 7, one re-fill device is connected into each of the holes 2 formed in the lid 1. The first ducts 112 channel the exhaust fumes, while said second ducts 113 channel the re-fill liquid which is conveyed to the elements of the accumulator.

After the re-fill devices 3 have been attached to lid 1, the re-fill process can begin. As shown in FIG. 4, the re-fill liquid is introduced through second ducts 113 in the direction of arrows 413. The re-fill liquid flows along said ducts 113, influencing all the re-fill devices, which are connected in parallel with each other.

It can be seen in FIG. 1 that the upper side of the flexible membrane 40 defines within the cavity 11 of body 10 an exhaust chamber 150 communicating with said one or more first holes 12 and with the upper end 130 of the stick 30. The lower side of the membrane 40 defines a chamber 50 for the build-up of the re-fill liquid, communicating with said one or more second holes 13.

Figure 8:
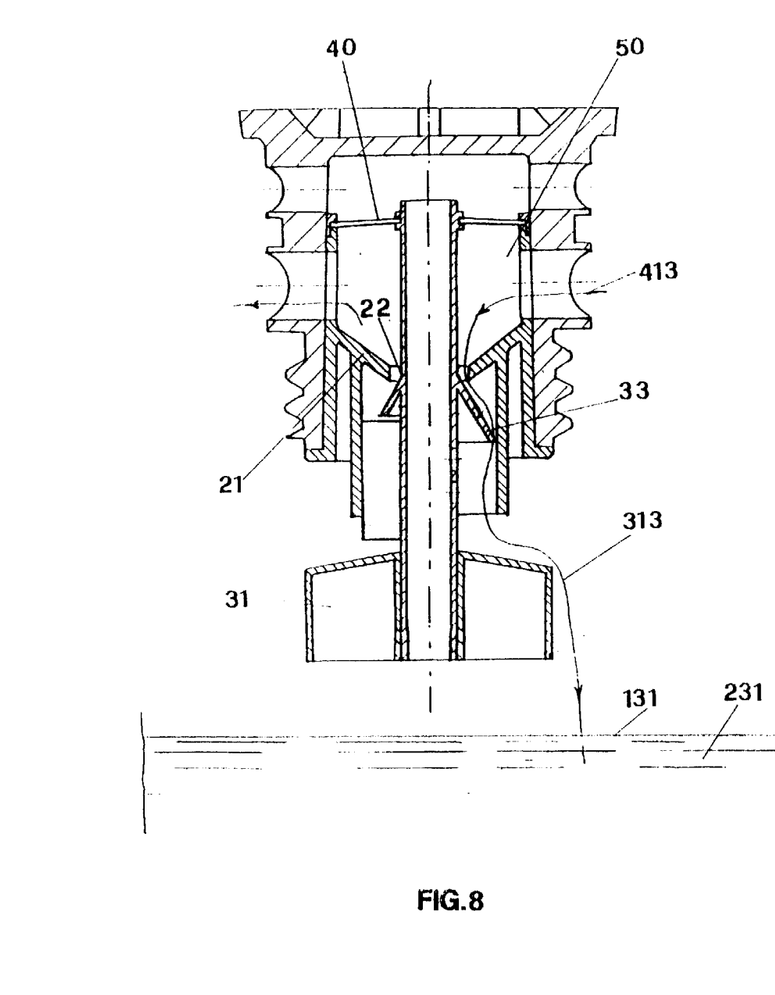
FIG. 8 shows operation of the re-fill device according to the invention during the re-fill process.

As can be observed in the detail of FIG. 8, when the re-fill operation begins, the surface 131 of the electrolyte 231 does not engage the float 31. As a consequence, the shutter on stick 30 is in a lower position, leaving the through-hole 22 in the transversal wall 21 open. As a result, the passage of the re-fill liquid flowing from the second ducts 113 into the build-up chamber 50 is permitted and thence through the through-hole 22, into the accumulator following arrow 313.

Figure 9:
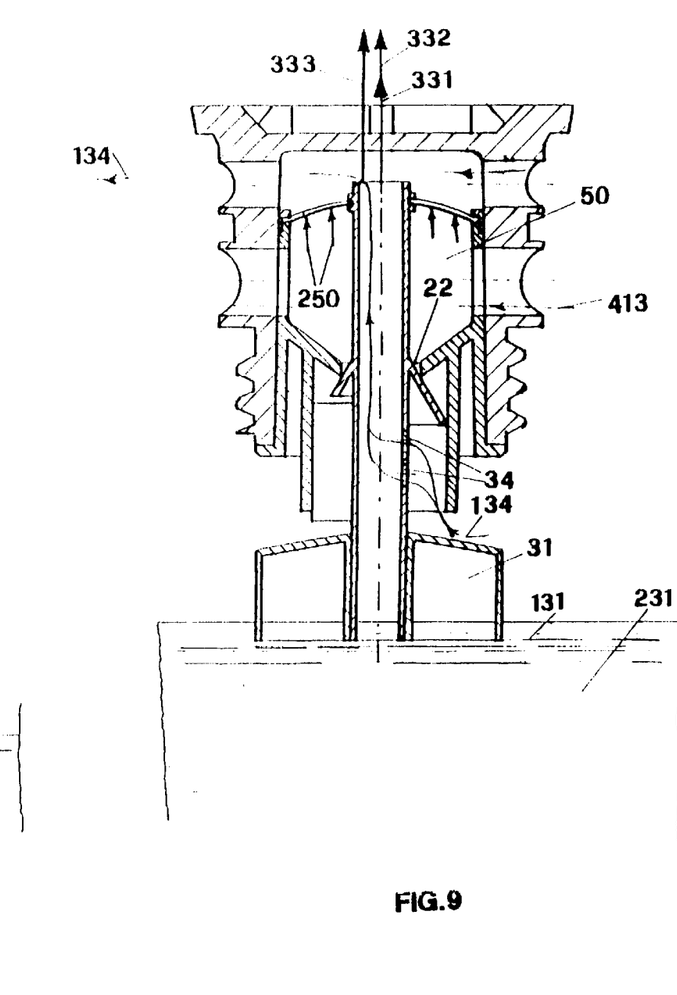
FIG. 9 shows operation of the re-fill device according to the invention once the re-fill process has been completed.

As can be observed in FIG. 9, the introduction of the re-fill liquid continues until the upper surface 131 of the electrolyte liquid 231 engages the float 31 causing it to float and lift the stick 30 vertically with a force shown symbolically by arrow 331. As a result the shutter 33 moves into the closing position against the through-hole 22. When this occurs, the flow of the re-fill liquid through the second ducts 113 is interrupted, causing within the build-up chamber 50 a supplemental pressure shown symbolically by arrow 250 against the flexible membrane 40 which causes its deformation. The pressure 250 exerts on membrane 40 a force which is smaller than the total weight of said float 31.

By acting against the surface of membrane 40, said pressure 250 generates force 332 in the same direction as force 331 due to the floating pressure. Thus a total force 333 for shutting off of the through-hole 22 results which is greater than force 331 due to the floating effect alone. The additional force 332, caused by the deformation of membrane 40 from the pressure of the re-fill liquid in chamber 50, insures a positive and effective closing of shutter 33 in hole 22 even if the accumulator is exposed to vibrations during the re-fill operation. Thus, the danger of leakage due to sudden oscillations, which can occur when re-fill devices are used, is significantly reduced. The additional force 332 insures the tightness of closure even with floats having smaller diameters than the normally larger floats used with known automatic re-fill devices.

During the re-fill operation the through-holes 34 formed in the tubular stick 30 above the floating body 31 permit the exhaust of the fumes following arrow 134. The fumes flow through the stick 30 to the outlet thereof, into exhaust chamber 150 and thereby through said first holes 2 and said first exhaust ducts 112.

Figure 5:
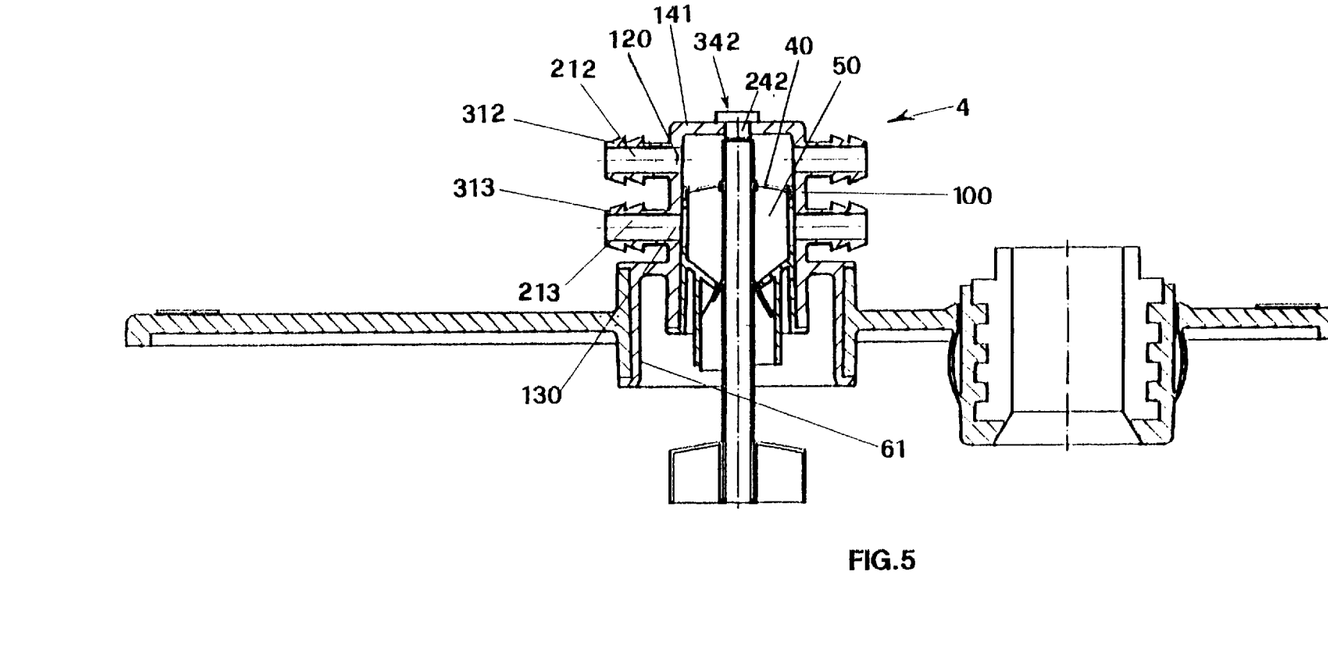
FIG. 5 shows another embodiment of the automatic re-fill device according to the invention secured in the lid.

Another embodiment of the automatic re-fill device 4 according to the invention is represented in FIG. 5. The device 4 has a body 100 formed with first holes 120 for discharge of the fumes and second holes 130 for the re-fill of liquid. These holes communicate respectively with first ducts 212 for the discharge of the fumes and with second ducts 213 for the inlet of the re-fill liquid. The ducts are provided with hose connectors 312 and 313 to receive a hose for respective channeling of the exhaust fumes and of the re-fill liquid. The bottom 141 of the body 100 may also have a through-hole 242 for allowing the introduction of a hydrometer for the electrolyte liquid.

Figure 10:
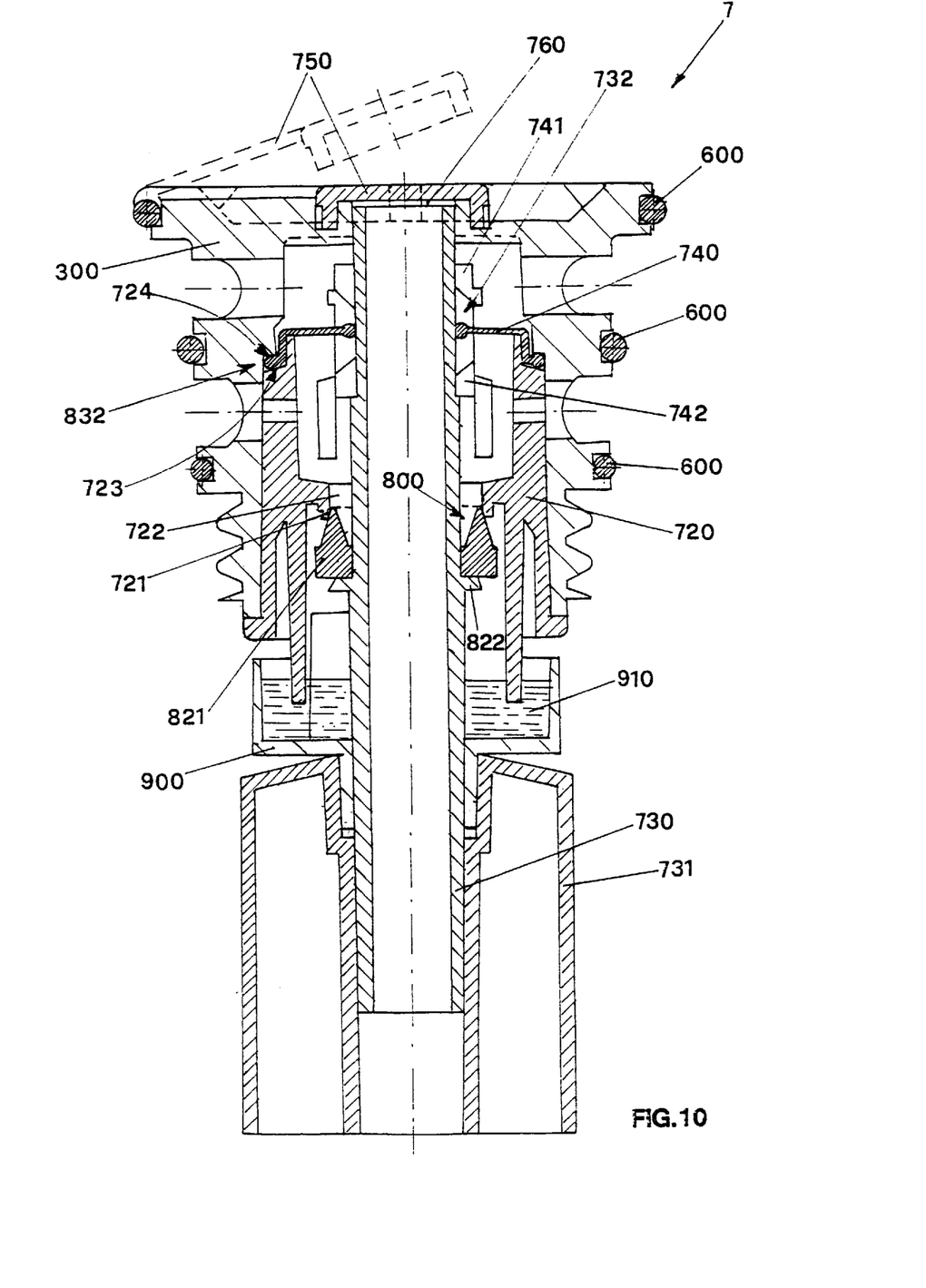
FIG. 10 shows another embodiment of the automatic re-fill device according to the invention.

Another embodiment of the invention is shown in FIG. 10. In this embodiment device 7 has a flexible membrane 740 is connected with tubular stick 730 through first sealing/locking means 732, comprising a pair of rings 741 and 742, placed opposite to each other and co-axial with the tubular stick 730, which engage the rim of the membrane 740 therebetween. Moreover, the flexible membrane 740 is also connected with tubular element 720 through second sealing/locking means 832 which is defined by a tilted plane 723 of tubular element 720 and by a corresponding shoulder 724 formed in the body 300 of the device 7. The outer rim of membrane 740 is captured between plane 723 and shoulder 724 forming a seal.

It can also be observed that through-hole 722 formed in the tubular element 720 is provided with a tapered seat 721 for contacting closing means 821. Said closing means 821 comprises a lip gasket in the shape of a truncated cone which engages a supporting ring 822 in a central location of the tubular stick 730.

It will be further observed that between the float 731 and the stick 730 a coaxial cup 900 is provided which has a cavity for collecting re-fill liquid 910. The liquid 910 creates a hydraulic seal with a lower edge of the tubular body 720 for preventing possible fumes building up within the accumulator from escaping into device 7, where said fumes would produce relative motion and consequently impair its function. The float 731 can be made in any suitable dimension. The body 300 also has sealing elements 600 and a lid 750 for stopping hole 760 for fume exhaust.

Another embodiment of the device, not represented in detail in the drawings, but which may be readily appreciated by one of skill in the art, may employ a through-hole 242, formed at the bottom 141 of the body 100 of said device, for exhausting fumes. In this case, body 100 will have only the second holes 130 communicating with the second ducts 213 for the inlet of the re-fill liquid.

On the basis of the foregoing it can be understood that the device according to the invention in all of its different embodiments achieves the proposed purposes. In all the embodiments the flexible membrane generates a force in addition to the pushing force of the float to ensure closing of the liquid inlet hole, even in the presence of vibrations in the accumulator during the re-fill operation.

It can also be seen that the possibility of generating the additional closing force permits the use of floats having a smaller diameter as compared with known devices.

It can also be seen that in the various embodiments the re-fill device according to the invention may be applied both on accumulators with lids which allow the channeling of the exhaust fumes and re-fill liquid through channels in the lids or on lids for accumulators wherein the re-fill devices are fed through a flexible hose.

It can also be seen that the device according to the invention in any of the embodiments which have been described may have a hole sized to allow the introduction of an instrument for measuring the density of the electrolyte, said hole being also used for the exhaust of the fumes during the re-fill operation.

During the manufacturing process modifications concerning the construction and the shape of the device according to the invention may be made. Such modifications are, however, to be considered as falling within the spirit and scope of the present invention.

I claim:

1. An automatic filling device for introducing electrolyte refill liquid into an electric accumulator, said device adapted to be inserted into a hole formed in the lid of an electric accumulator having at least one first duct for fume discharge and at least one second duct for refill liquid, comprising:

a body sealingly insertable into the hole having a cavity and top, said body having at least one first hole for fume discharge, communicating with the corresponding first duct for the discharge of the fumes and at least one second hole for refill, communicating with the corresponding second duct for the inlet of the re-fill liquid;

a tubular element including an outer tubular section having a side wall portion sized for matching said cavity in said body having at least one through-opening for communicating with said at least one second hole; and a cylindrical guiding element co-axial with said outer tubular section;

a transversal surface formed within the tubular element having a central throughhole;

a tubular stick having an open upper end, said stick being slidingly secured in said hole and passing through said transversal surface;

a float formed at a lower end of the stick co-operating with the liquid within the accumulator to produce an upward pushing force on the float;

a flexible membrane having a central opening and an outer edge, being connected with said tubular stick at the upper end;

first sealing locking means for securing the stick in the opening of the central membrane, and second sealing locking means for connecting the outer edge of the flexible membrane to the side wall of the tubular section; said tubular stick further including closing means located intermediate the ends thereof for engaging with said hole in said transversal surface to seal it, to selectively permit and prevent passage of re-fill liquid flowing from said at least one second hole, said flexible membrane defining on one side thereof within said tubular member an exhaust chamber communicating with said at least one first hole and with the open end of said tubular stick and, on an opposite side, a build-up chamber for allowing build-up of the refill liquid, communicating with said at least one second hole and within which pressure of said built-up refill liquid contained therein causes the deformation of said membrane, to produce on said tubular stick a force which increases the pushing force provided by said float.

2. A device according to claim 1, wherein the stick and float have a weight and the pressure of the liquid within said build-up chamber is such as to exert on said membrane a force which is smaller than the weight of said float and of said stick supporting it.

3. A device according to claim 1, wherein said tubular stick is hollow and has at least one through-hole for discharge of the fumes, said through-hole being arranged above said float and below the closing means.

4. A device according to claim 1, wherein said tubular stick includes radially projecting guiding fins slidingly matching an inner surface of said guiding element.

5. A device according to claim 1, wherein said body has an outer thread which matches within a corresponding inner thread in said hole in the lid.

6. A device according to claim 1, wherein said at least one first hole comprises aligned opposed, coplanar openings, and said at least one second hole comprises aligned opposite, coplanar openings parallel to the first holes, such that said first holes and said second holes each communicate with corresponding ducts for the discharge of the fumes and with ducts for the inlet of the re-fill liquid in the lid respectively.

7. A device according to claim 1, wherein said body further comprises a hose connection for each of said at least one first and second holes so that said first and said second holes communicate each for the discharge of the fumes and for the inlet of the refill liquid through respective ones of said hose connections.

8. A device according to claim 1, wherein said closing means comprises a shutter having the shape of a truncated cone, sized to fit by interference inside the through-hole in said transversal surface.

9. A device according to claim 1, wherein said body has a bottom portion and said at least one first hole comprises a single through-hole formed in the bottom portion of said body.

10. A device according to claim 1, wherein said transversal surface has the shape of a truncated cone converging toward an interior portion of the accumulator.

11. A device according to claim 1, wherein said first sealing locking means comprises an annular indentation formed on said tubular stick for receiving a corresponding inner rim in the opening of said flexible membrane.

12. A device according to claim 1, wherein said second sealing locking means comprises an annular indentation formed in said tubular element for receiving the outer edge portion of said flexible membrane.

13. A device according to claim 1, wherein said closing means comprises a sealing lip in the shape of a truncated cone, for sealingly matching said through-hole in said tubular element.

14. A device according to claim 1, wherein said first sealing locking means comprises a pair of rings located opposite each other and co-axial with said tubular stick, for securing an outer rim of said membrane therebetween.

15. A device according to claim 1, wherein said second sealing locking means comprises a slanted plane formed in said tubular element and a corresponding shoulder formed in the body for receiving the outer edge of said membrane therebetween.

16. A device according to claim 1, wherein said body includes a lid for closing said hole for the fume exhaust and for checking a level and density of the electrolyte.

17. A device according to claim 1, wherein a cup is arranged coaxially between said float and said stick, said cup having a cavity for receiving refill liquid therein.

18. A device according to claim 17, wherein the tubular element has a lower end for engaging the cavity in the cup therebetween.

19. A lid for electric accumulators suited to receive at least one of said automatic refill devices according to claim 1, wherein said lid has a plurality of said holes each for receiving a corresponding one of said devices, each of said holes communicating with the first ducts for the discharge of the fumes exhausted from the accumulator, and with second ducts for the inlet of the refill liquid through second holes.

20. The lid of claim 19, wherein the lid comprises a moldable plastic and said first and second ducts are formed by moulding the plastic material within a selected thickness of said lid.

* * * * *